T. GARRICK.
Lawn Mower.
No. 89,981.  Patented May 11, 1869.
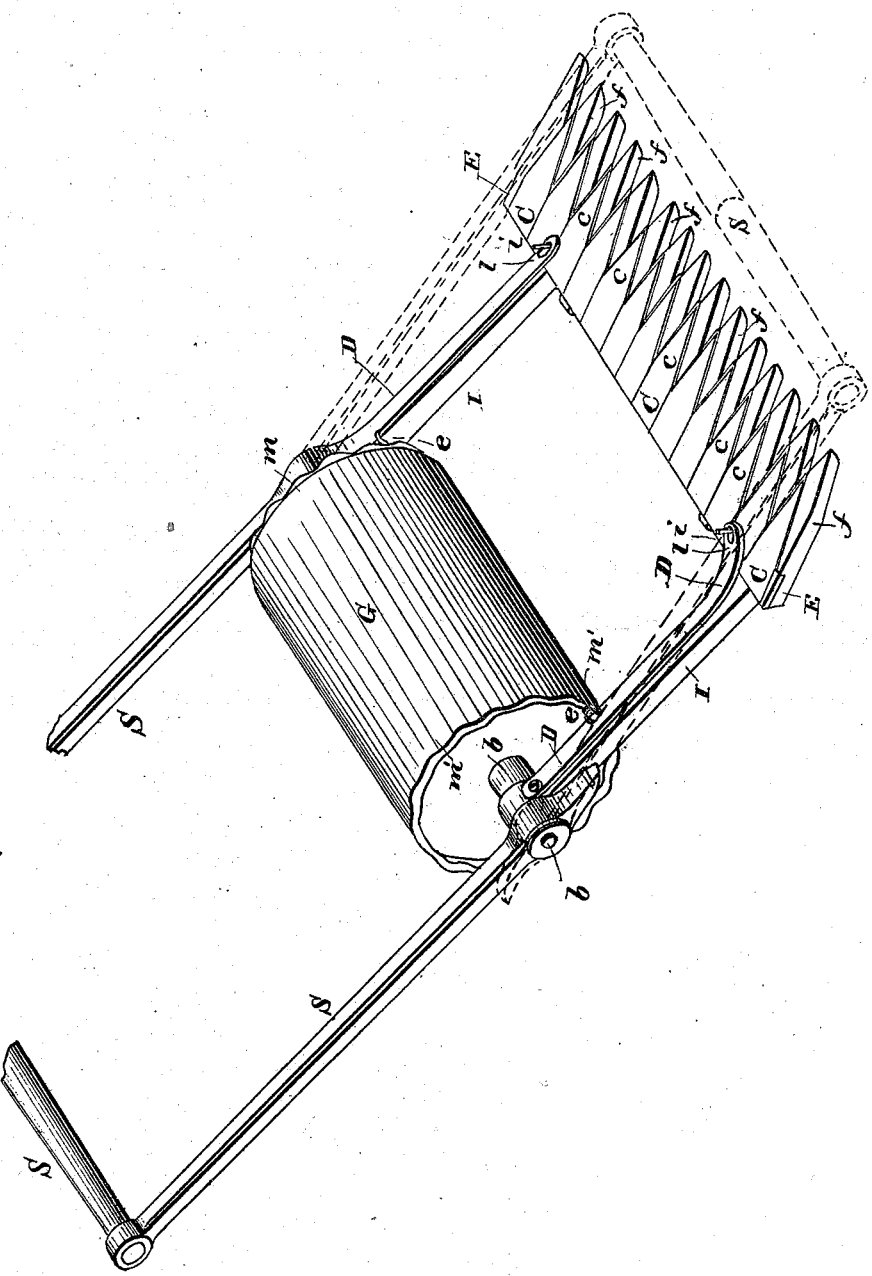
Witnesses:
Inventor:
Thomas Garrick

UNITED STATES PATENT OFFICE.

THOMAS GARRICK, OF PROVIDENCE, RHODE ISLAND.

IMPROVEMENT IN LAWN-MOWERS.

Specification forming part of Letters Patent No. 89,981, dated May 11, 1869.

*To all whom it may concern:*

Be it known that I, THOMAS GARRICK, of the city and county of Providence, and State of Rhode Island, have invented a new and Improved Lawn Mower and Roller; and I do hereby declare that the following is a full, clear, and exact description of the same, reference being had to the accompanying drawings, making part of this specification, in which—

Figure 1 is a perspective view of my improved machine.

My invention consists of a trundle-roller and a series of cams as a driving mechanism, a finger-bar and set of cutters as a cutting mechanism, operated by said cams, combined and arranged within a suitable frame-work, so as to be conveniently operated by manual labor for shaving and rolling lawns and small plats of grass, as and in the manner hereinafter set forth—that is to say:

The said roller (marked G in the drawings) is a heavy cylinder of cast-iron or other material, having an axis or shaft, $b$, protruding from each end thereof, upon which it revolves or rolls upon the ground by pushing against the hand-shafts S, composed of two side strips and a cross-bar, which are formed with bearings, to receive the two ends of the said shaft $b$, so as to be conveniently and easily trundled before or in advance of the person or operator, as and for the purposes herein described.

In connection with this roller and handshaft is arranged a finger-bar, E, composed of fingers $f$, of triangular or other suitable form, calculated to subdivide the mass of grass-blades growing within its space, and to properly incline the blades of grass that pass between the said fingers to meet and be clipped off by the series of angular blades C C, &c., of the cutting device, which have a rapid vibrating motion laterally close to the upper surface of the said fingers.

This cutting apparatus is secured by each end to the protruding shaft of the said roller by means of the side pieces I of the framework, which also is formed with suitable bearings, in which said shaft revolves.

The cutting apparatus being thus placed in advance of the said roller, the cutters or blades C C are operated with a rapid vibrating movement by means of the levers D D and a series of serpentine cams, $m$ $m'$, that are formed upon or secured to each end of the roller G, and revolve with it, said levers being hinged to the side pieces I at $v$, near the axis of the roller, and are provided with friction-rollers $e$ $e$, which roll against the serpentine faces of the cams $m$ $m'$, which are so arranged with respect to each other that a depression upon one, $m$, is precisely opposite to and acts with a corresponding swell, $m'$, on the other cam, so that the two levers move simultaneously in the same direction, and accordingly with their free ends $l$ $l$ connected, by the pins $i$ in the cutter-bar C, to slits formed therein. The vibrating movement of the levers produced by the cams is communicated to the cutter-bar to cut the grass as the machine is trundled over it, the roller thus furnishing the necessary cutting movement and following after over the space where the cutting has been performed, and rolling the cut surface to a uniform level or plane.

The finger-bar and the hand-shafts are mounted or hung upon the axis of the roller independently of each other, but so that at the same time, when occasion requires, the two can be connected together, the forward ends of the hand-shafts for this purpose projecting under pins on the arms of the finger-bar, or engaging with said bar in an equivalent manner.

Under this arrangement the finger-bar can rise and fall to conform with the rise and fall of the ground, the hand-shafts can be raised or lowered to the necessary extent to suit the height of person using the machine, and at the same time, when the finger-bar is to be lifted to avoid obstruction, this can readily be effected by bearing down upon the hand-shafts so as to elevate the front of the machine to the height required.

Having described my invention and the manner in which the same is or may be carried into effect, what I claim, and desire to secure by Letters Patent, is—

The combination, with the trundle-roller and its cams and the finger-bar frame and hand-shafts hung upon the axis of the roller, as described, of the cutter-bar and the vibratory levers by which it is operated, under the arrangement herein shown and set forth.

In testimony whereof I have hereunto subscribed my name this 4th day of March, 1869.

THOMAS GARRICK.

Witnesses:
ISAAC A. BROWNELL,
WILLIAM BROWNELL.